United States Patent [19]

Burward-Hoy

[11] Patent Number: 5,452,362

[45] Date of Patent: Sep. 19, 1995

[54] APPARATUS AND METHOD FOR COOLING WITH NOISE CONTROL

[75] Inventor: Trevor Burward-Hoy, Cupertino, Calif.

[73] Assignee: Sun Microsystems, Inc., Mountain View, Calif.

[21] Appl. No.: 186,968

[22] Filed: Jan. 26, 1994

[51] Int. Cl.⁶ .............................................. H04B 5/00
[52] U.S. Cl. ...................................................... 381/71
[58] Field of Search ................................ 381/71, 94; 361/690–698; 181/200, 201, 202, 206, 224

[56] References Cited

U.S. PATENT DOCUMENTS 4,989,252 1/1991 Nakanishi et al. ...................... 381/71

FOREIGN PATENT DOCUMENTS 0013997 1/1991 Japan ...................................... 381/71
0188798 8/1991 Japan ...................................... 381/71
404264496A 9/1992 Japan ...................................... 381/71

Primary Examiner—Edward L. Coles, Sr.
Assistant Examiner—Jerome Grant, II
Attorney, Agent, or Firm—Blakely, Sokoloff Taylor & Zafman

[57] ABSTRACT

An acoustic duct using active noise cancellation to reduce the acoustic signature of a computer system is disclosed. The acoustic duct is coupled to a vent of a thermal box that encloses the components (the heat source) and the fan cooling system (the noise source) of the computer system. The acoustic duct is constructed as an acoustic waveguide such that the flow of air through the thermal box is not impeded. An anti-noise circuit that generates an anti-noise signal is positioned near the vent such that the anti-noise signal and the noise signal generated by the noise source propagate through and out of the acoustic duct in the same mode.

7 Claims, 3 Drawing Sheets

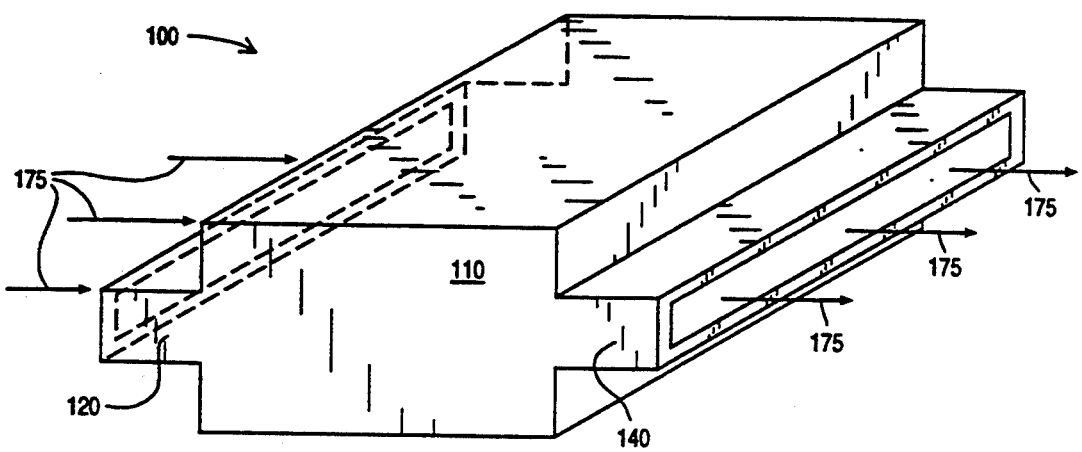
FIG_1A
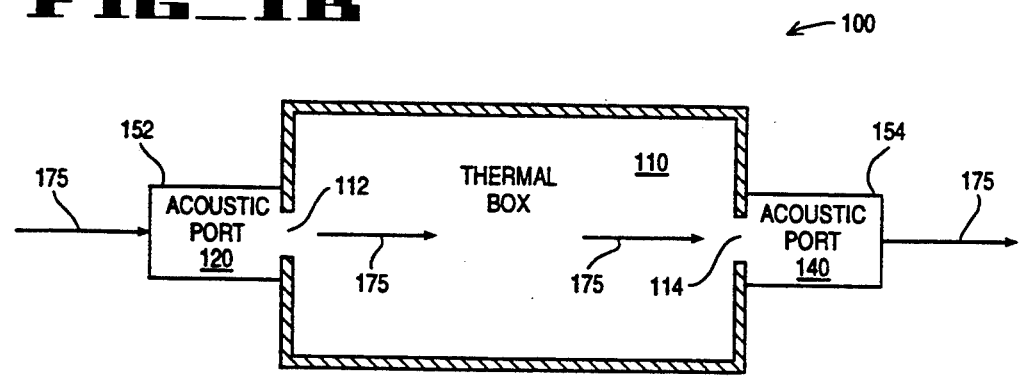
FIG_1B
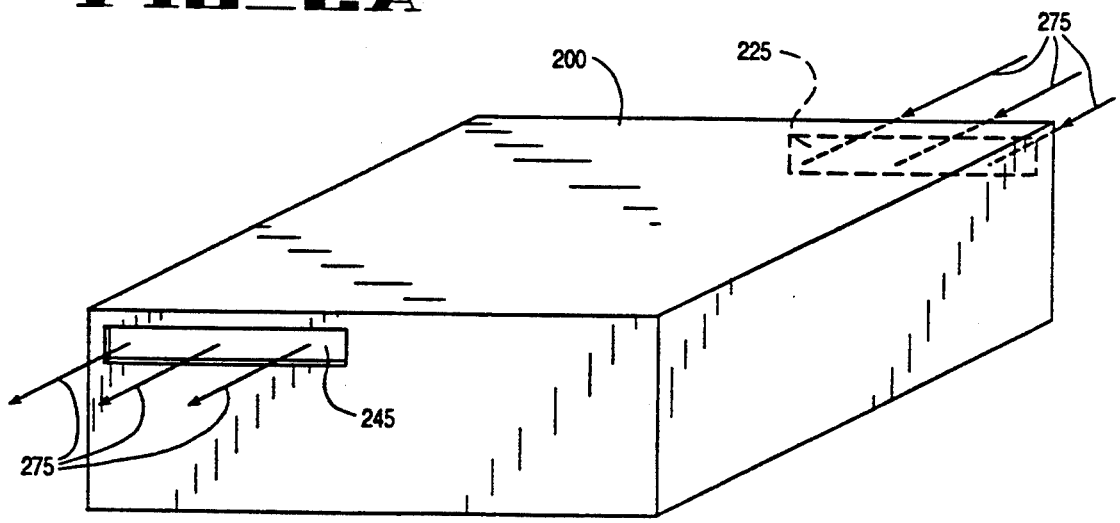
FIG_2A

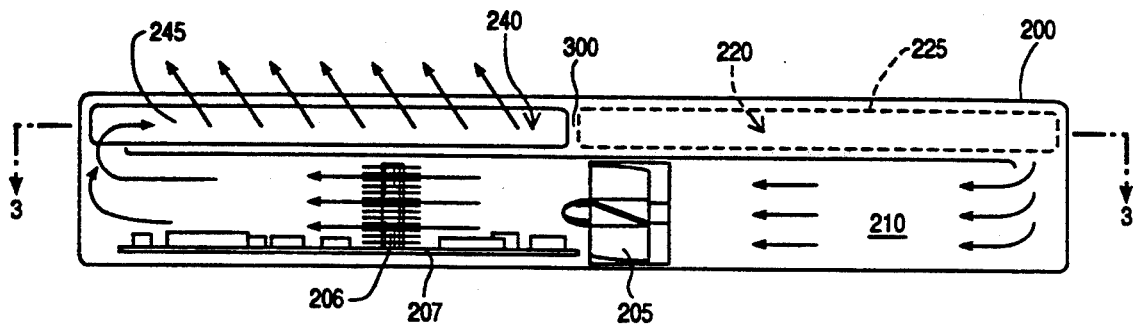
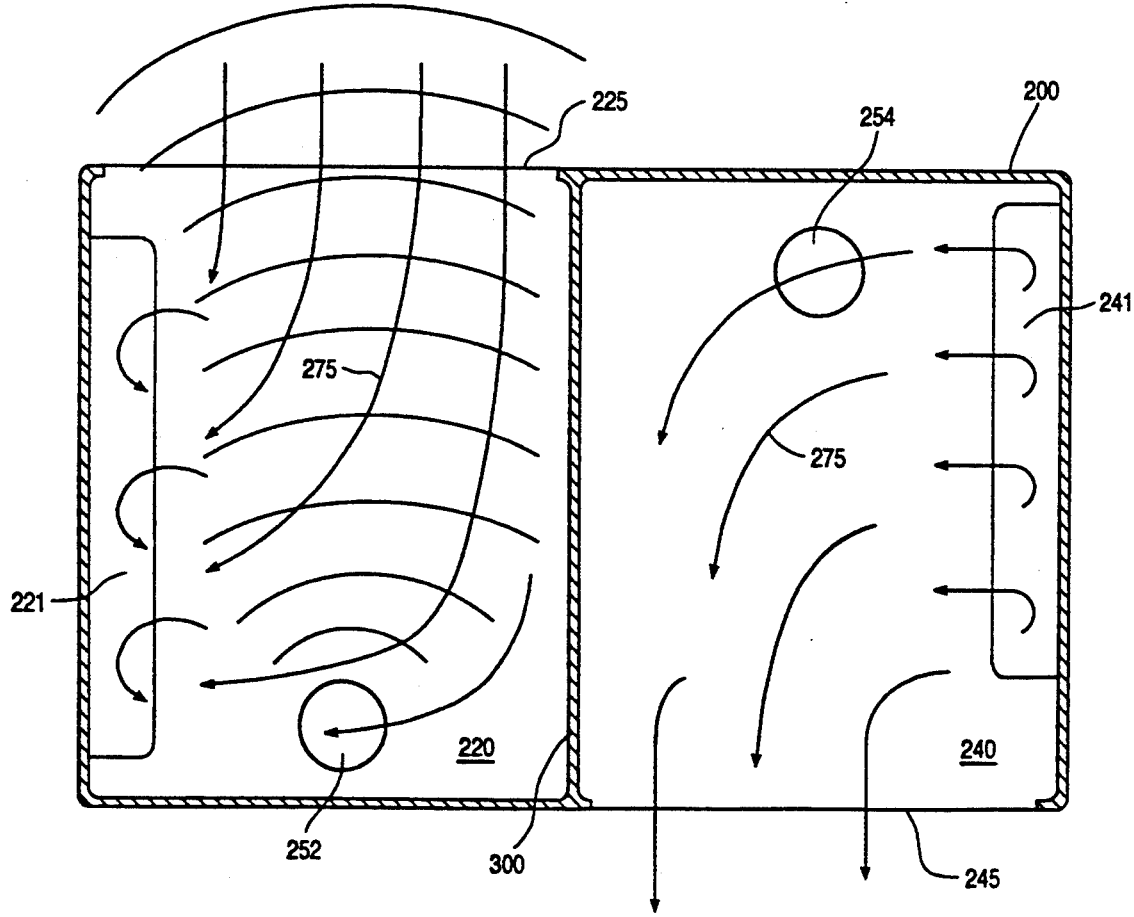

FIG_4
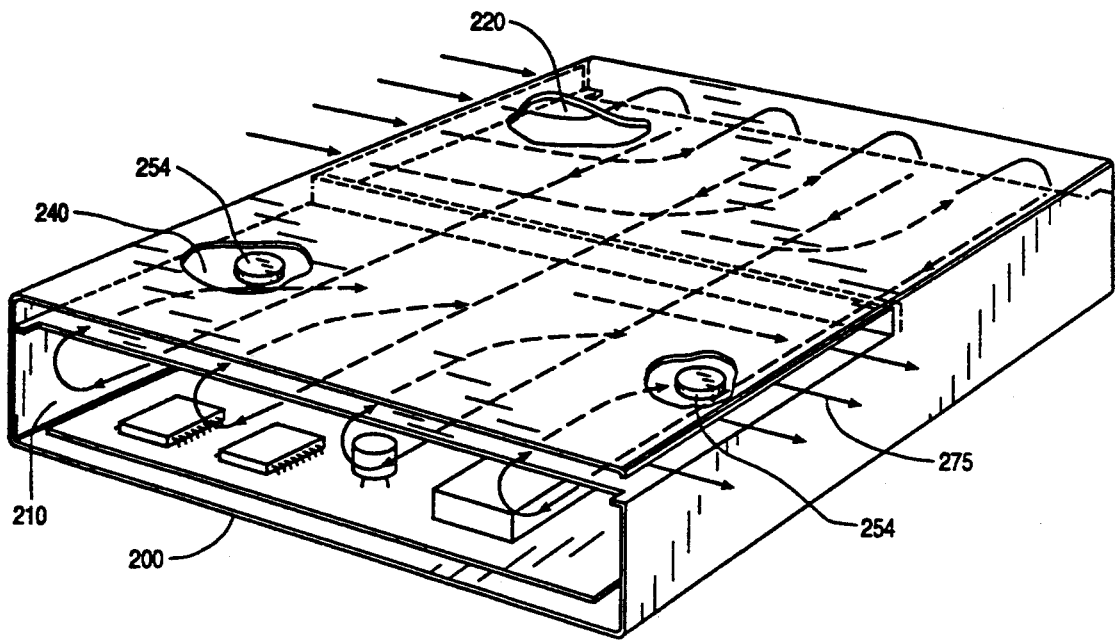
FIG_5A
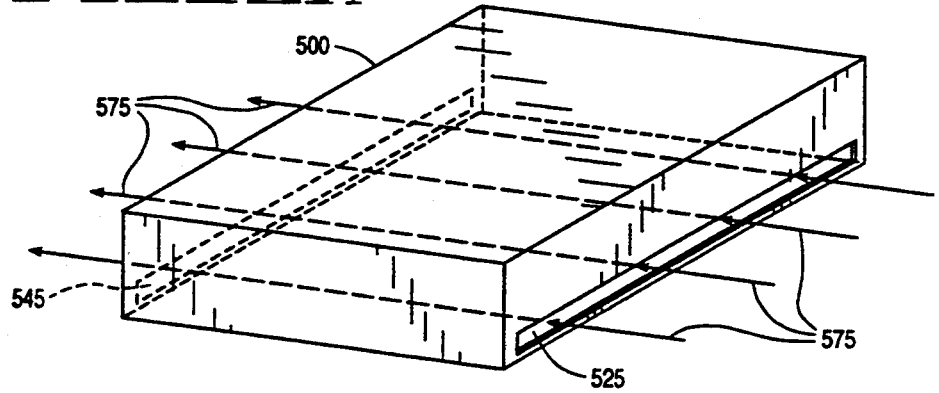
FIG_5B
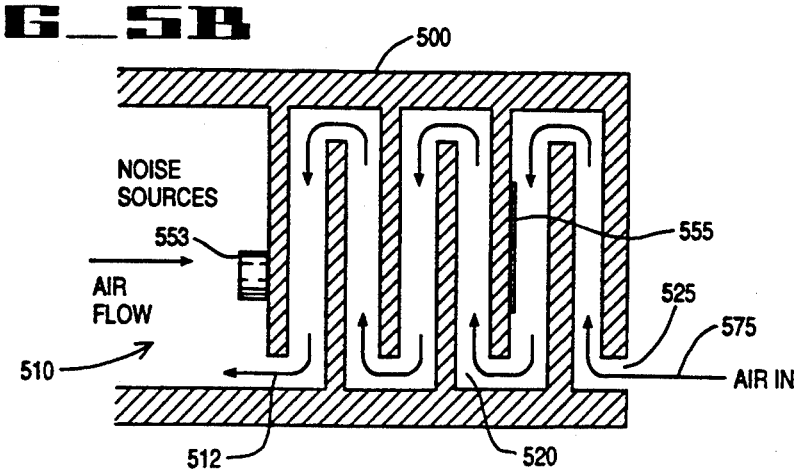

APPARATUS AND METHOD FOR COOLING WITH NOISE CONTROL

BACKGROUND OF THE INVENTION

1. Field of the Invention

The methods and apparatus taught in the present application relate generally to the field of noise reduction in a computer system. Specifically, the present invention teaches a component enclosure that provides improved noise reduction.

2. Art Background

Typical prior art computer enclosure designs are driven by three primary goals: to provide a proper thermal operating environment for the components; to minimize the size of the enclosure; and to minimize the acoustic signature of computer system to nearby observers. However, by practical necessity, computer enclosures must at least minimally meet the thermal goal because system failure can occur if the system components operate at a temperature beyond the specified operating temperature. In order to provide a proper thermal operating environment, the enclosure is typically designed to support the operation of a cooling system that uses a fan to provide a steady flow of air across the components. This typically results in the enclosure having a number of air vents or slots cut into its side walls.

The use of a fan cooling system increases the acoustic signature of the computer system because the operation of the fan produces noise, which escapes to the numerous slots and vents in the enclosure. Thus, computer enclosure design is often a compromise between the thermal goal and the noise goal. For example, a designer can use foam or some form of passive noise reduction. However, the foam is bulky, potentially increasing the footprint of the enclosure, and the foam will block air flow through the slots and vents, compromising the thermal goal. A second option is to reduce the acoustic signature of the fan in order to produce a corresponding reduction in the acoustic signature of the enclosure. This typically requires running the fan at a voltage that is below the optimum operating voltage of the fan, or it may require the use of a smaller fan. The thermal goal is then compromised.

The result is often a design that meets the acoustic goal only to the extent that the thermal goal can be compromised. Thus, typical designs diminish the cooling capacity of the cooling system in order to reduce the acoustic signature only slightly. Recent advances in integrated circuit design are increasing the difficulty of designing an adequate computer enclosure.

Modern manufacturing processes allow a more dense population of transistors in the same die space, leading to integrated circuit chips that run hotter than previous chips. Therefore, more cooling is required. One solution to meeting the thermal goal is to increase the size of the fan in order to move more air across the components. Of course, this solution has an impact on the goals to minimize the acoustic signature and the physical size of the enclosure. This leads to the counterintuitive result that as chip size decreases, the size of the enclosure increases.

The compromises inherent in prior art enclosure designs are becoming unacceptable, and a new approach to computer enclosure design is needed. Therefore, as will be described, the method and apparatus of the present invention disclose a two phase approach to enclosure design in which the thermal goal and the acoustic goal are addressed substantially in isolation. More particularly, there is disclosed a thermal box that has a limited number of well-defined openings to which are attached acoustic ducts that combine passive and active noise cancellation techniques to reduce the acoustic signature of the enclosure.

SUMMARY OF THE INVENTION

The method and apparatus described present an improved computer enclosure design. In the first embodiment, an acoustic duct for reducing the acoustic signature of a computer system is disclosed. The acoustic duct is coupled to an enclosure containing the components of the computer system and the fan cooling system for blowing air to cool the components. The components act as a heat source and the fan acts as a noise source. A noise signal escapes the enclosure via an air vent that allows air to flow freely through the enclosure.

The acoustic duct has a chamber capable of acting as an acoustic waveguide having a first opening coupled to the vent and a second opening allowing the free flow of air. The acoustic duct includes an anti-noise circuit for generating an anti-noise signal that cancels the noise signal such that the acoustic signature of the computer system is reduced. The anti-noise circuit is positioned in the acoustic waveguide near the vent such that the anti-noise signal and noise signal propagate through the acoustic waveguide and out the second opening in a same mode.

A second embodiment discloses an enclosure for reducing the acoustic signature of the computer system including a thermal box, an acoustic inlet duct, and an acoustic exhaust duct. The thermal box encloses the heat source and the noise source and has a first vent and a second vent for allowing air to flow through the thermal box. The acoustic inlet duct is coupled to the first vent and the acoustic exhaust duct is coupled to the second vent. Both the acoustic inlet duct and the acoustic exhaust duct allow the free flow of air while attenuating the noise signal generated by the noise source using an anti-noise signal to produce a wave-cancelling effect, reducing the acoustic signature of the system. Additionally, passive noise attenuation techniques may be implemented to further reduce the acoustic signature.

BRIEF DESCRIPTION OF THE DRAWINGS

The objects, features, and advantages of the method and apparatus of the present invention will be apparent from the following detailed description of the invention in which:

FIG. 1a is a perspective view of a simplistic model of a two-phase enclosure design.

FIG. 1b is a cross-sectional view of a simplistic model of a two-phase enclosure design.

FIG. 2a is a perspective view of a first illustrative embodiment of a two-phase enclosure design.

FIG. 2b is a cross-sectional view of the first illustrative embodiment along the A—A axis.

FIG. 3 is a top view of the first illustrative embodiment along the B—B axis showing the configuration of the acoustic ducts and the anti-noise circuits.

FIG. 4 is a cross-sectional perspective view of the first illustrative embodiment.

FIG. 5a is a perspective view of a second illustrative embodiment of the two-phase enclosure design.

FIG. 5b is a cross-sectional view of the second illustrative embodiment along the A—A axis showing the serpentine slot shape of the acoustic duct and the antinoise circuit.

DETAILED DESCRIPTION OF THE INVENTION

A system of defined inlet and exhaust ducts for airflow is designed to cooperate with a computer cooling system so that active noise cancellation techniques can reduce the total acoustic signature of the system to a nearby observer. In particular, the computer enclosure disclosed separates the design of the enclosure into two distinct phases. The first phase of the design meet the thermal requirements of the computer system. The second phase of the design is designed to minimize the acoustic signature of the enclosure. Although the present invention is described with reference to specific figures, it will be appreciated by one of ordinary skill in the art that such details are disclosed simply to provide a more thorough understanding of the present invention. It will therefore be apparent to one skilled in the art that the present invention may be practiced without the specific details. In other instances, well known circuits are shown in simplified form in order not to obscure the present invention unnecessarily.

FIG. 1a is a perspective drawing of an illustrative two-phase enclosure design. It should be noted that this figure is extremely simplified and is offered to introduce the idea of bifurcated enclosure design. The enclosure 100 includes a thermal box 110, an acoustic inlet duct 120 and an acoustic outlet duct 140. Thermal box 110 is preferably manufactured of an anechoic material and encloses the components of the computer system as well as the cooling system used to cool the components. The components act as a heat source, and the cooling system typically employs a fan to move air across the components, cooling them.

FIG. 1b is a cross-sectional view of the two-phase enclosure of FIG. 1a. A thermal box inlet 112, which is shown as a gap in the thermal box, provides for air flow into the thermal box 110. An acoustic inlet duct 120 is coupled to the thermal box inlet 112. The acoustic inlet duct 120 is designed to allow a sufficient volume of air to flow through the enclosure 100 while minimizing the acoustic signature of the system to an acceptable level. The acoustic inlet duct 120 is a chamber that preferably is designed to act as an acoustic waveguide to minimize the acoustic signature by attenuating acoustic signals generated by a fan or other noise source contained in the thermal box 110. Air flows into the acoustic inlet duct 120 from the atmosphere via enclosure inlet 152. The air flows through the acoustic inlet duct 120 into the thermal box 110 via the thermal box inlet 112. This shown by air flow lines 175.

The thermal box outlet 114 is a shown as a gap in the wall of the thermal box providing the flow of heated air out of the thermal box 110. Air flows out of the thermal box 110 through the thermal box outlet 114 and the acoustic exhaust duct 140 where it escapes into the atmosphere via enclosure exhaust 154. The acoustic exhaust duct 140 is designed with the same considerations as the acoustic inlet duct 120. Both the acoustic inlet duct 120 and the acoustic outlet duct 140 use active and passive noise cancellation techniques and are preferably manufactured of an anechoic material.

Because the thermal box 110 is manufactured of anechoic material, it generates noise signals only at thermal box inlet 112 and thermal box outlet 114. The fact that the thermal box has well-defined inlet and outlet simplifies the task of noise reduction. The acoustic inlet duct 120 and the acoustic outlet duct 140 attenuate the noise signal at the thermal box inlet 112 and the thermal box outlet 114, respectively. Ideally, the noise signals are completely eliminated. In this manner, the thermal goal and the acoustic goal can be addressed individually, reducing the interdependence of typical prior art designs. It will be understood by one of ordinary skill in the art that acoustic ducts can be used with existing enclosure designs.

FIG. 2a illustrates a first embodiment of the present invention. FIG. 2a a perspective view of the computer enclosure 200. There is shown the enclosure inlet 225 and the enclosure outlet 245. Air flows into and out of the enclosure as indicated by air flow lines 275. As can be seen, air flow into and out of the enclosure is restricted to the use of the enclosure inlet 225 and the enclosure outlet 245.

FIG. 2b is a cross-sectional view of a computer enclosure 200 along the A—A axis. The thermal box is configured such that the thermal box inlet (not shown) and the thermal box outlet (not shown) are placed at the top of the thermal box 210. Therefore, the acoustic inlet duct 220 and the acoustic exhaust duct 240 are placed at the top of the thermal box 210. Although the acoustic inlet duct 220 and the exhaust duct 240 are contiguous, they are separated by a barrier 300, which is preferably manufactured of anechoic material. The enclosure inlet 225 is shown as a box having a dashed line and is located on the opposite side of the enclosure 200. Air is pulled into the acoustic inlet duct via the enclosure inlet 225 through the action of a fan 205, which is part of the cooling system of the computer system. The air enters the thermal box 210 via the thermal box inlet (not shown).

The thermal box 210 encloses the fan 205 for moving air from the thermal box inlet through the thermal box 210 and out thermal the outlet in order to cool the heat source 206, which may be, for example, an integrated circuit on the printed-circuit board 207. The heated air is forced into the acoustic exhaust duct 240 and out the enclosure exhaust 245, which is on the face of the computer enclosure 200. The flow of the air is illustrated by the flow lines 275. As can be seen, the air exits the enclosure 200 in a direction substantially normal to the face (out of the page) of the enclosure 200. It should also be noted that the flow of air within the enclosure 200 is substantially perpendicular to the flow of the air as it enters and exits the enclosure 200. This means that the air "turns a corner" somewhere within the enclosure 200. While the air can navigate such corners, sound will be attenuated. This will be discussed in greater detail below. The remaining figures illustrating the first embodiment will use the same numbering as described in relation to FIGS. 2a and 2b so as to avoid any confusion that may arise.

FIG. 3 illustrates a top view of the enclosure 200 along the B—B axis. FIG. 3 clearly shows that the acoustic inlet duct 220 and the acoustic exhaust duct 240 are separated by the barrier 300. Further, the thermal box inlet 221 and the thermal box outlet 241 are clearly illustrated. As can be seen from the flow lines 275, the air flows into the acoustic inlet duct 220 and then down into the thermal box 210 via the thermal box inlet 221.

Similarly, the air flows up from the thermal box 210 into the acoustic exhaust 240 via the thermal box outlet 241. These are the "corners" referred to earlier. Care should be taken to insure that a pressure loss perceivable by the fan 205 is not by produced by the sound dampening corners. Such a pressure loss affects the efficiency of the cooling system. If the thermal box inlet 221 and the thermal box outlet 241 are of sufficient width, pressure loss can be minimized.

The design of the acoustic ducts 220 and 240 will now be discussed in greater detail. First, the chambers of acoustic ducts 220 and 240 preferably are designed as acoustic waveguides using passive noise cancellation techniques that are known in the prior art. For example, it is well known in the art that the shape of a chamber affects the acoustic properties of the chamber. Thus, the shape of the acoustic inlet and exhaust ducts may be chosen using standard acoustic waveguide techniques to attenuate an acoustic signal. Further, the dimensions of the acoustic ducts 220 and 240 affect the acoustic properties of the ducts. Preferably, the dimensions of the acoustic ducts 220 and 240 are a large fraction of the largest wavelength of the noise signal that is to be attenuated. A final example of passive attenuation techniques include the use of sound dampening materials such as foam in the construction of the acoustic ducts 220 and 240. One of ordinary skill in the art will understand that the aforementioned examples are merely representative, not exhaustive, of passive acoustic signal attenuation techniques.

The acoustic ducts 220 and 240 also use active noise cancellation techniques to further reduce the acoustic signature of the computer enclosure 200. Preferably, an active noise cancellation circuit is used to generate an anti-noise signal. A typical range of frequencies that is appropriate for active noise cancellation is from 400 Hz to 1 kHz. Active noise cancellation circuits are well known in the prior art and are commercially available, for example, from Noise Control Technologies, located in Baltimore, Md. The anti-noise signal is generated by sampling the noise signal and shifting the sampled signal by 90 degrees. This is done by the active noise cancellation circuit using digital signal processing and logic. Ideally, adding the noise signal to the anti-noise signal results in no net acoustic signal being apparent to an observer.

In order to insure that the acoustic signature of the system is minimized regardless of the position of an observer relative to the system, care must be taken to properly position the anti-noise signal generator of the active noise cancellation circuit. The anti-noise signal and the noise signal preferably exit the enclosure in essentially the same mode such that any observer will detect the same amount of attenuation regardless of his position relative to the system. This goal is preferably achieved by introducing the anti-noise signal into the acoustic duct at essentially the same point that the noise signal is introduced into the acoustic duct. This insures that the anti-noise signal is subject to the same acoustic environment that operates on the noise signal. The acoustic environment will thus operate upon the anti-noise signal in a manner similar to its operation on the noise signal.

If the anti-noise signal generator is positioned at the mouth of the acoustic outlet 245, for example, equal attenuation cannot be guaranteed at every position of the space into which the acoustic signals are being projected. This is because multiple phases of the noise signal are being projected into space simultaneously. In a sense, the acoustic outlet 245 can be considered as having a number of noise sources arrayed across it. By placing the anti-noise signal at the mouth of the acoustic outlet, only a small portion of these noise sources can be effectively cancelled. Thus, equal attenuation cannot be achieved easily.

Therefore, acoustic inlet duct 220 contains an anti-noise circuit 252, which is an active noise cancellation circuit. The anti-noise circuit 252 includes a transducer and a pickup. The pickup of the anti-noise circuit 252 samples the noise in the acoustic inlet duct 220 and the transducer generates an anti-noise signal that is substantially the same signal as the sampled noise signal but 90 degrees out of phase with the noise signal. This produces an acoustic wave cancelling effect, reducing the noise perceived by the observer.

The transducer may be a speaker attached to a wall of the acoustic inlet duct 220. Alternatively, an entire wall of the acoustic inlet duct may be constructed of a mechanical piezo or magneto-restrictive material that is used as the transducer. The pickup is preferably placed immediately near the inlet 221, but the placement of the pickup is not generally as critical as the placement of the transducer. The acoustic exhaust duct 240 is similarly equipped with an anti-noise circuit 254, which is positioned according to the same considerations as anti-noise circuit 252.

FIG. 4 is a cross-sectional perspective view of the enclosure 200 at one end. Again, the flow lines 275 indicate the direction of air flow. FIG. 4 illustrates the fact that two anti-noise circuits can be used in one acoustic duct.

FIG. 5a is a perspective view of a second embodiment of the two-phase enclosure. Flow lines 575 indicate that air enters the enclosure 500 via enclosure inlet 525 and that heated air exits the enclosure 500 via the enclosure outlet 545.

FIG. 5b is a cross-sectional view of the second embodiment illustrated in FIG. 5a. Specifically, FIG. 5b illustrates the acoustic inlet duct 520 and a portion of the thermal box 510 of the enclosure 500. As can be seen, the inlet 512 of the thermal box 510 is placed on the side of the thermal box 510. Accordingly, the acoustic inlet duct 520 is connected to the side of the thermal box 510 upon which the inlet 512 is positioned. Air flows as indicated by flow lines 575. The configuration of the acoustic exhaust duct (not shown) is substantially the same as that of the acoustic inlet duct 512.

In the second embodiment, the air turns a number of corners in the acoustic ducts. This serpentine slot is preferably fabricated with variable density or noise attenuating foam to form an air flow path having high acoustic attenuation and low air flow restriction. The fingers of the serpentine slot are preferably tuned in the manner of a comb filter to attenuate the desired frequencies. Again, the process of tuning the acoustic duct may be done in accordance with any one of a number of known prior art passive noise attenuation techniques.

The acoustic inlet duct contains an anti-noise circuit having a transducer 555 for generating an anti-noise signal and a pickup 553 for sampling and analyzing the noise signal in order to generate the anti-noise signal. The transducer 555 is similar to the transducer discussed in relation to the first embodiment.

Thus, method and apparatus have been described that provide a two phase approach to enclosure design in which the thermal goal and the acoustic goal are addressed substantially in isolation. Further, the acoustic phase of the present invention may be practiced with existing enclosure designs. While the method and apparatus have been described in terms of its presently preferred and alternative embodiments, those skilled in the art will recognize that the present invention may be practiced with modification and alteration without departing from the spirit and scope of the disclosure. The specifications and drawings are, accordingly, to be regarded as illustrative rather than restrictive.

What is claimed is:

1. An apparatus for reducing an acoustic signature of a computer system having an enclosure containing a heat source generating heat and a noise source generating a noise signal, the noise signal increasing the acoustic signature, the enclosure having a vent allowing flow of air to cool the heat source, the apparatus comprising:
    an acoustic duct coupled to the enclosure, the acoustic duct including:
        a chamber having a first opening coupled to the vent and a second opening for allowing air to flow through the chamber and the vent, wherein the chamber is configured as a serpentine slot that is tuned as a comb filter such that predetermined frequencies of the noise signal are attenuated by the chamber, the noise signal capable of propagating through the chamber; and
        an anti-noise circuit positioned in the chamber, the anti-noise circuit for generating an anti-noise signal that reduces the noise signal such that the acoustic signature is reduced, the anti-noise circuit being positioned in the chamber near the vent such that the anti-noise signal and noise signal propagate through the chamber and out the second opening.

2. In a computer system having an acoustic signature, an enclosure comprising:
    a thermal box for enclosing a heat source and a noise source, the noise source capable of generating a noise signal that increases the acoustic signature, the enclosure including a first vent and a second vent for allowing air to flow through the thermal box, the air for cooling the heat source;
    an acoustic inlet duct, coupled to the first vent, the acoustic inlet duct for allowing air to flow to the first vent and for reducing the noise signal such that the acoustic signature of the computer system is decreased, wherein the acoustic inlet duct includes:
        a first chamber having a first opening coupled to the vent and a second opening for allowing air to flow through the chamber and the vent, the noise signal capable of propagating through the first chamber;
        a first anti-noise circuit positioned in the first chamber, the anti-noise circuit for generating a first anti-noise signal that reduces the noise signal such that the acoustic signature is reduced, the first anti-noise circuit being positioned in the first chamber near the first vent such that the first anti-noise signal and noise signal propagate through the first chamber and out the second opening; and
    an acoustic exhaust duct, coupled to the second vent, the acoustic exhaust duct for allowing air to flow from the second vent and for reducing the noise signal such that the acoustic signature of the computer system is decreased, wherein the acoustic exhaust duct includes:
        a second chamber having a third opening coupled to the second vent and a fourth opening for allowing air to flow through the chamber and the second vent, the noise signal capable of propagating through the second chamber; and
        a second anti-noise circuit positioned in the second chamber, the second anti-noise circuit for generating a second anti-noise signal that reduces the noise signal such that the acoustic signature is reduced.

3. The enclosure as claimed in claim 2, wherein the second anti-noise circuit is positioned in the second chamber near the second vent such that the second anti-noise signal and the noise signal propagate through the second chamber and out the fourth opening.

4. The enclosure as claimed in claim 2, wherein the first and second chambers further include an apparatus for passively attenuating the noise signal.

5. The enclosure as claimed in claim 4, wherein the first chamber and the second chamber have dimensions that are a substantial fraction of a largest wavelength to be attenuated.

6. The enclosure as claimed in claim 4, wherein the first chamber is configured as a serpentine slot.

7. The enclosure as claimed in claim 6, wherein the serpentine slot is tuned as a comb filter such that predetermined frequencies are attenuated.

* * * * *